No. 786,241. PATENTED MAR. 28, 1905.
C. R. TRAXLER.
STAY LOG FOR VENEER CUTTING MACHINES.
APPLICATION FILED MAR. 6, 1905.
2 SHEETS—SHEET 1.
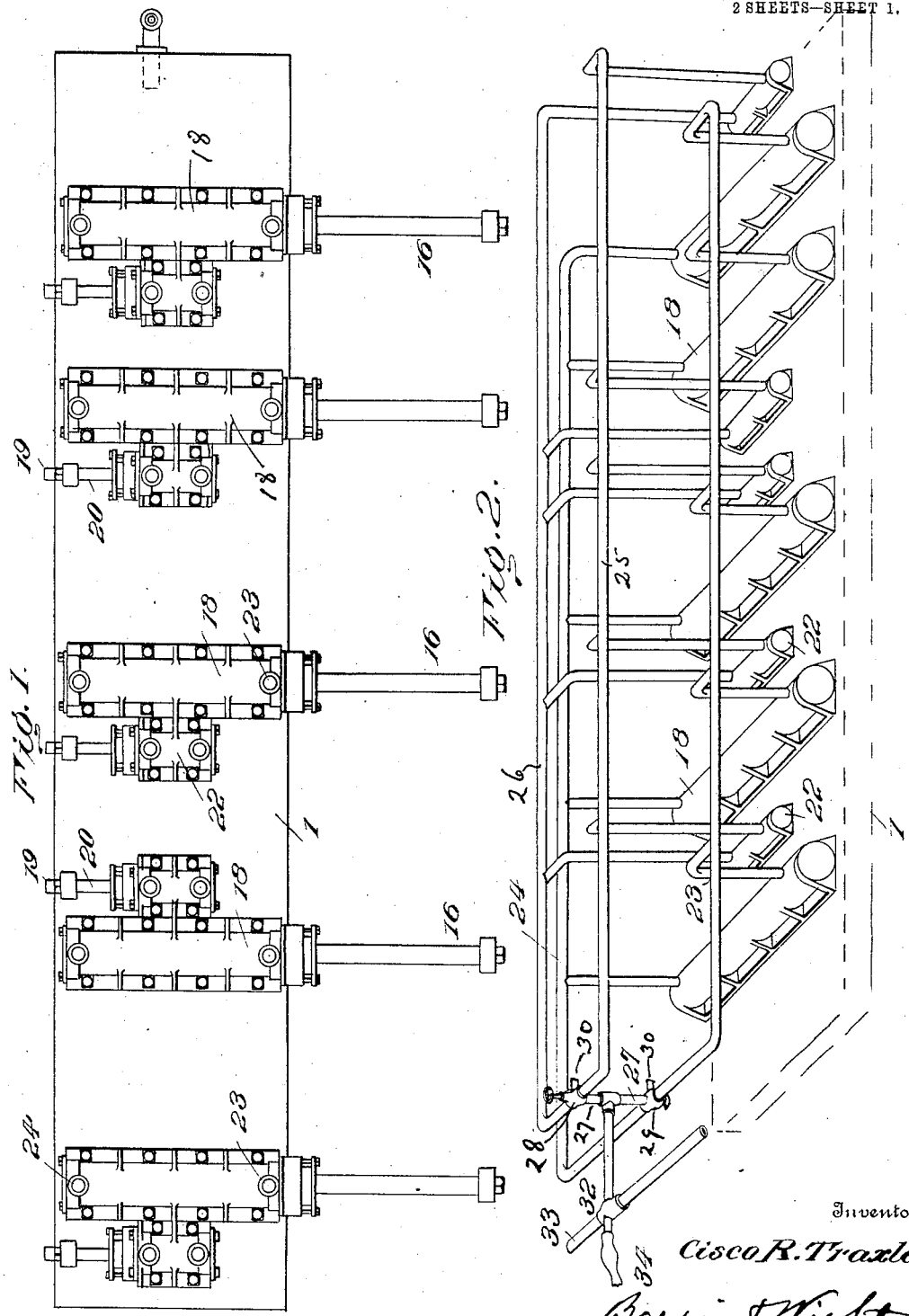

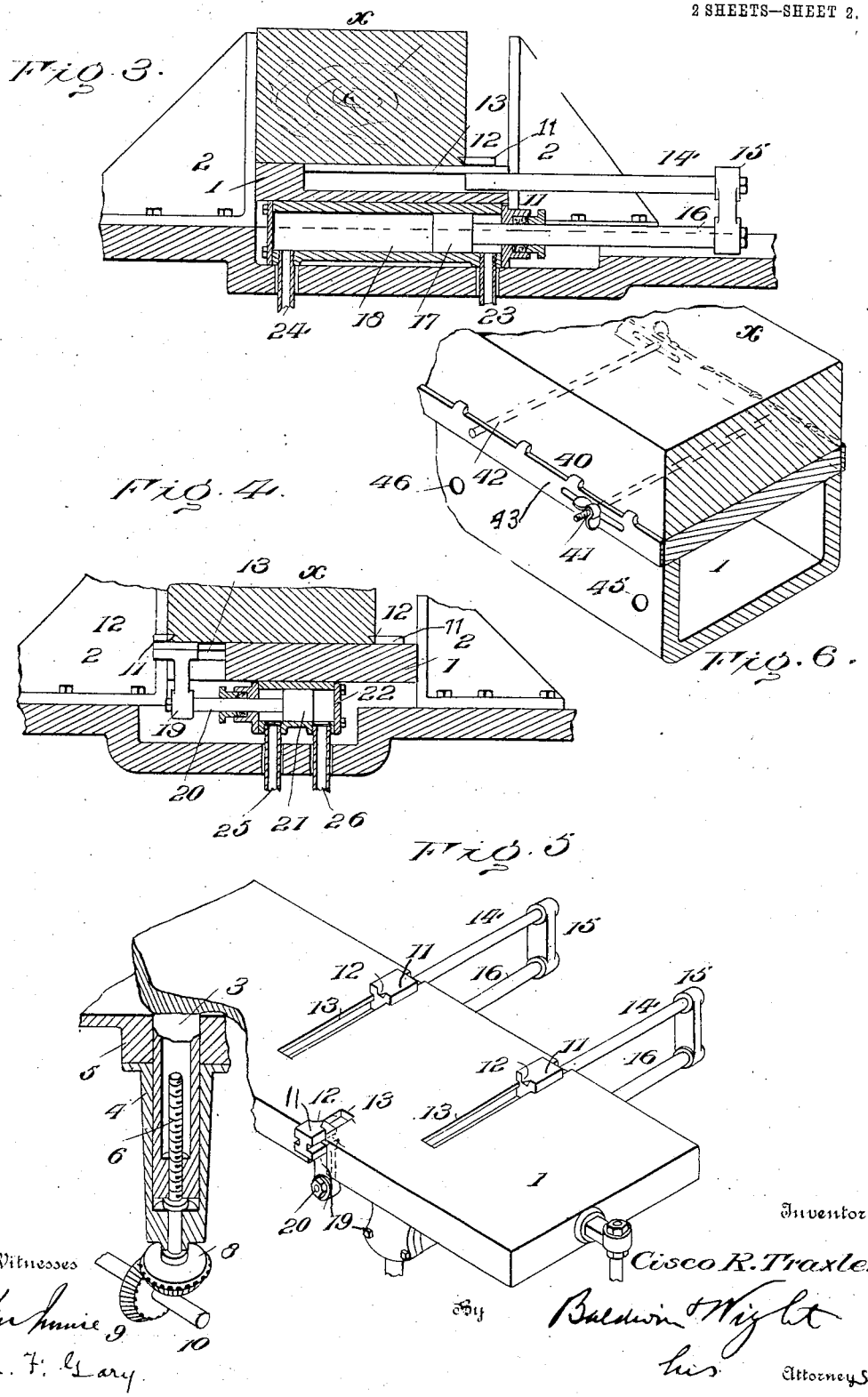

No. 786,241.

Patented March 28, 1905.

UNITED STATES PATENT OFFICE.

CISCO R. TRAXLER, OF WINSTON SALEM, NORTH CAROLINA.

STAY-LOG FOR VENEER-CUTTING MACHINES.

SPECIFICATION forming part of Letters Patent No. 786,241, dated March 28, 1905.

Application filed March 6, 1905. Serial No. 248,375.

*To all whom it may concern:*

Be it known that I, CISCO R. TRAXLER, a citizen of the United States, residing at Winston Salem, in the county of Forsyth and State of North Carolina, have invented certain new and useful Improvements in Stay-Logs for Veneer-Cutting Machines, of which the following is a specification.

In my application for patent, Serial No. 212,095, filed June 11, 1904, I have shown a veneer-cutting machine in which the bolts or blocks to be cut up into veneer are secured to the stay-logs by chucks, which are operated by steam. Each stay-log has secured to it a number of cylinders to which steam is admitted and from which it is exhausted, and in these cylinders operate pistons which are connected with the chucks. The arrangement is such that all of the chucks on a stay-log or on a series of stay-logs may be simultaneously operated to secure the bolts or blocks to the stay-log or to release them therefrom.

Since I filed my application for patent above mentioned I have discovered that the cylinders are so arranged that sufficient heat is radiated therefrom to impart to and maintain a temperature in the bolts or blocks which puts them into a favorable condition for the cutting operation. Ordinarily the bolts or blocks are steamed or treated with hot water prior to being placed in the machine, and often it is necessary to remove the bolts from the machine to reheat them with steam or hot water; but I have discovered that in my machine it is not necessary to moisten the logs or to remove the bolts to reheat them, as the heat radiating from the chuck-operating cylinders is sufficient to keep the bolts at a sufficiently high temperature to enable them to be cut without liability of the veneer cracking or warping. I have also discovered that this same idea may be applied to stay-logs of various kinds which may be heated in other ways. For instance, the stay-log may be made hollow and supplied with steam or other heating medium, and the chucks may be operated in any suitable way.

In the accompanying drawings I have shown how my invention may be carried out.

Figures 1, 2, 3, 4, and 5 are views of the stay-log and stay-log-operating mechanism shown in my application for patent above mentioned, while Fig. 6 represents a modification. Fig. 1 is a rear view of one of the stay-logs and shows particularly how the chucks and their operating mechanism are arranged thereon. Fig. 2 is a diagram showing the pipes connecting the chuck-cylinders with the source of steam-supply. Figs. 3 and 4 are views in transverse section, showing particularly how the blocks are supported on the stay-logs and how the chucks hold the blocks in place thereon. Fig. 5 is a perspective view of a portion of a stay-log with its chucks.

The stay-log 1 is arranged between brackets 2 and is moved back and forth between the brackets as the cutting operation progresses. In Fig. 5 I have shown a part of the mechanism for moving the stay-log back and forth. 3 indicates a hollow arm which is secured to the stay-log, (in practice there are a plurality of said arms,) fitting a cylindrical socket or casing 4, attached to the frame 5. Through the rear end of each socket 4 projects a rod 6, that is free to revolve in the end of the socket, but is prevented from moving endwise therein. The inner or forward end of the rod is threaded and engages a threaded opening in the rear end of the arm 3, the arrangement being such that by turning the rod 6 the stay-log may be advanced or retracted. The rod 6 carries a beveled pinion 8, which gears with a corresponding pinion 9 on a shaft 10, which may be operated in any suitable way, the specific mechanism preferred being shown in my application for patent above mentioned.

I have not illustrated the details of the mechanism for operating the stay-log, as that forms no part of my present invention. It should be understood, however, that the steam-cylinders hereinafter described keep the bolt or block of wood at a high temperature during the entire time that the stay-log is being advanced by the mechanism indicated. The chucks 11 are shown as consisting of blocks having spurs 12, adapted to engage the block *x* and having suitable tongue-and-groove connections with slots 13 in the stay-log. The chucks 11 on one side of the stay-log are attached to relatively long rods 14, connected by cross-heads 15 with piston-rods 16, having pistons 17, working in cylinders 18, attached to the rear face of the stay-log in the manner shown in Figs. 1 and 2. The chucks 11 on the opposite side of the stay-log are in like manner connected by cross-heads 19 to relatively short piston-rods 20, having pistons 21, working in cylinders 22, arranged on the stay-log in the manner illustrated in Figs. 1 and 2. In the drawings I have shown five chucks on each side of the stay-log, and there are five corresponding large cylinders 18 and five small cylinders 22; but of course this number may be varied. Each of the large cylinders, as shown clearly in Fig. 2, is connected at one end with a supply-pipe 23 and at the opposite end with a corresponding pipe 24, while each of the smaller cylinders is in like manner connected to the pipes 25 26. These pipes are connected with a pipe 27 by means of four-way valves 28 29 and which are provided with exhaust-ports 30.

When securing a block to the stay-log, both sets of chucks are withdrawn to the longitudinal edges of the stay-log. Then steam is admitted behind the pistons 17, and the chucks 11 are forced against the block $x$, and the block is forced against the brackets 2 in the manner indicated in Fig. 3, the spurs 12 at the same time embedding themselves in the block. The steam is still left on, and then steam is admitted behind the pistons 21 in the shorter cylinders, and the spurs on the corresponding chucks are driven firmly into the block $x$ without moving it away from the brackets 2.

When it is desired to release the block or spalt from the stay-log, steam is admitted at the opposite ends of the cylinders, and the chucks are withdrawn. The pipe 27 is connected by a pipe 32 with another pipe 33, which connects with another flexible pipe 34, in turn connected with the source of supply. The mechanism illustrated is precisely the same as that described and claimed in my application before mentioned; but in that application it was not stated that the block or bolt was kept warm by the cylinders. In fact, it was not at that time known that the block would be sufficiently heated in this way. I have since discovered, however, that by supplying sufficient steam or steam at a proper temperature to the cylinders which operate the chucks the log may be heated in the manner described.

In Fig. 6 I have shown a modification. In this instance the chucks 40 are operated by devices 41 42 43 of well-known construction. The stay-log 1 is made hollow and has an entrance-port 45 for steam or other heating medium and an exhaust-port 46. If steam at a sufficiently high temperature is admitted to a stay-log thus constructed, the bolt or block which it carries will be kept warm and in good condition for being cut up into veneer.

I am thus enabled to operate continuously a veneer-cutting machine without removing the bolts or blocks for resteaming or reheating, and it is not necessary to pass the blocks during the operation of the machine through hot water or other similar heating medium.

I claim as my invention—

1. A stay-log for veneer-cutting machines equipped with means for heating it, to thus maintain a sufficiently high temperature in the bolt or block to be cut, substantially as described.

2. A stay-log for veneer-cutting machines provided with means for securing a bolt of wood thereto and carrying means for raising its temperature to enable it to impart heat to the bolt or block which it carries.

3. A stay-log for veneer-cutting machines equipped on one side with chucks for securing a bolt of wood thereto and carrying on its opposite side steam-cylinders having pistons connected to and operating the chucks and arranged, when steam at sufficiently high temperature is admitted, to heat the bolt carried by the stay-log.

4. A stay-log for veneer-cutting machines, carrying on one side means for securing a bolt or block of wood thereto and having means in rear of its front face within the area in which the bolt lies for heating the stay-log from one end thereof to the other whereby the bolt to be cut may be uniformly heated.

In testimony whereof I have hereunto subscribed my name.

CISCO R. TRAXLER.

Witnesses:
C. E. LEAK,
T. M. BLEAKLEY.